3,293,249
HYDROXYPHENYL-TRIAZINES AND PROCESS FOR THEIR MANUFACTURE

Hans Rudolf Biland, Basel, Christian Luethi, Muenchenstein, and Max Duennenberger, Frenkendorf, Switzerland, assignors to Ciba Limited, Basel, Switzerland, a company of Switzerland
No Drawing. Filed Apr. 27, 1965, Ser. No. 451,331
Claims priority, application Switzerland, May 4, 1964, 5,799/64
4 Claims. (Cl. 260—248)

The present invention provides valuable new hydroxyphenyl-1,3,5-triazines, like for instance the compound of the formula (1)
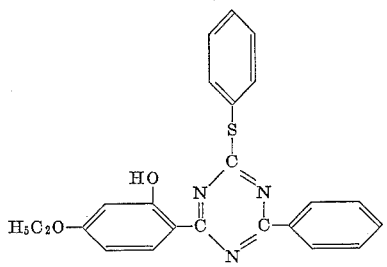

that is to say compounds whose essential and important structural features are (a) The direct bond of a phenyl nucleus with the triazine ring,
(b) The bond between an aromatic ring (or of a heterocycle condensed with a benzene ring) and the triazine ring through a sulphur bridge, and
(c) The direct bond of a resorcinyl residue (which may be modified in the para-position) with the triazine ring.

Furthermore, the present invention provides a novel process for the manufacture of this type of compounds which makes the manufacture of the above-characterized type of compounds particularly easy, starting from the cyanuric chloride ring system. Finally, the invention includes also the use of these hydroxyphenyl-1,3,5-triazines as agents for protecting organic materials from the harmful effects of air and heat and especially of ultraviolet rays.

In the most general case the compounds referred to above may correspond to the general formula (2)
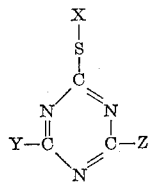

where X represents a hydrogen atom or an organic residue bound with the sulphur atom through a carbon atom; Y represents a benzene residue which is bound directly with the triazine ring through a cyclic carbon atom and contains in ortho-position to the said bond a hydroxyl group and in para-position to the said bond a possibly etherified hydroxyl group or the group (3)
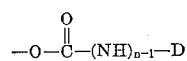

where $n=1$ or $2$ and D is an organic residue, Z represents a halogen atom, especially chlorine, or a benzene residue.

The residue X in the Formula 2 may be for instance a hydrogen atom, an alkenyl group such as allyl or crotyl, a cycloalkyl group such as cyclohexyl, a possibly substituted alkyl, phenyl or naphthyl group, or a 2-benzazolyl group. As examples of substituted alkyl groups there may be mentioned:

$$H_5C_2\!-\!O\!-\!CH_2\!-\!CH_2$$
$$-\!CH_3\!-\!CH_2\!-\!CH_2\!-\!S\!-\!CH_2\!-\!CH_2\!-$$
$$Cl_2HC\!-\!CH_2\!-\!CH_2\!-$$
$$CH_3OOC\!-\!CH_2\!-$$
$$C_2H_5OOC\!-\!CH_2\!-$$
$$HO\!-\!CH_2\!-\!CH_2\!-\text{ and}$$
$$C_6H_5\!-\!CH_2\!-$$

Preferred residues X are, for example, alkyl groups containing up to 18 carbon atoms, such as methyl, octyl or octadecyl or 2-benzazolyl groups such as 2-benzthiazolyl, benzoxazolyl or benzimidazolyl, or benzene residues of the formula (4)
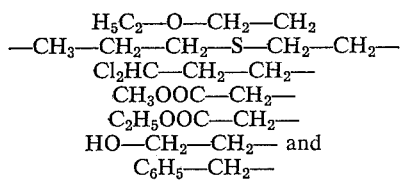

where $h$ and $k$ are identical or different and each represents a hydrogen or halogen atom, or an alkyl group containing up to 8 carbon atoms, and $l$ stands for a hydrogen or halogen atom or for an alkyl group containing up to 8 carbon atoms, or a mercapto, carboxyl, nitro, amino or phenyl group, or a carbalkoxy or alkoxy group containing up to 8 carbon atoms. As examples of such benzene residues there may be mentioned:

phenyl,
ortho-methylphenyl,
meta-methylphenyl,
para-methylphenyl,
2,4-dimethylphenyl,
para-chlorophenyl,
2,4,5-trichlorophenyl,
2-mercapto-methylphenyl,
para-phenyl-phenyl,
2-aminophenyl,
2-nitrophenyl and
2-carboxyphenyl.

Valuable compounds of the Formula 2 are, for example, those in which X represents a hydrogen atom, an alkyl group containing up to 12 carbon atoms, a 2-benzthiazolyl or 2-benzimidazolyl group, or a benzene residue of the formula (5)
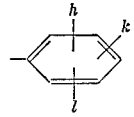

where $h_1$ stands for a hydrogen or chlorine atom, or for an alkyl group containing up to 4 carbon atoms.

The residue Y in the Formula 2 may, for example, correspond to the formula (6)
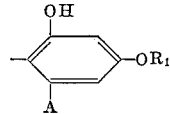

where $R_1$ represents a hydrogen atom, an alkenyl group, a possibly substituted alkyl group or a residue of the formula (7)
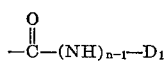

(where $n=1$ or 2 and $D_1$ represents an alkyl or cycloalkyl group or a benzene residue) and A stands for a hydrogen atom or a residue —$OR_1$. Y may also be a residue of the formula (8)
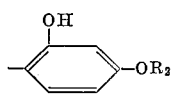

where $R_2$ represents a hydrogen atom, or an alkyl group containing up to 18 carbon atoms which may be substituted by a chlorine atom or by a hydroxyl, cyano, carboxyl, carbalkoxy or carbamyl group, such as ethyl, dodecyl, octadecyl,

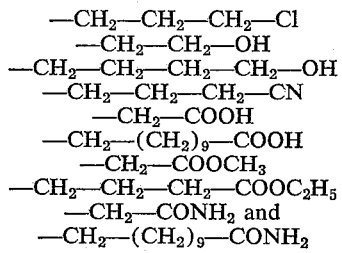

or an aralkyl or alkenyl group containing up to 9 carbon atoms, such as benzyl, para-chlorobenzyl, para-methylbenzyl, para-methoxybenzyl, phenylpropyl,

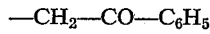

allyl or crotyl, or a residue of the formula (9)
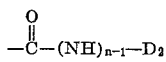

where $n=1$ or 2 and $D_2$ stands for an alkyl group containing up to 18 carbon atoms, such as ethyl, octyl or octadecyl, or a phenyl group which may be substituted by a chlorine atom, by a phenyl or hydroxyl group, or by an alkyl or alkoxy group containing up to 8 carbon atoms, such as phenyl, para-chlorophenyl, para-phenylphenyl, ortho-hydroxyphenyl, para-methylphenyl, para-octylphenyl, para-tertiary butoxyphenyl or para-methoxyphenyl.

A preferred residue Y is that of the formula

(10)
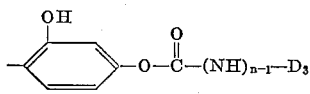

where $n=1$ or 2 and $D_3$ represents an alkyl group containing up to 12 carbon atoms, or a phenyl group which may be substituted by a chlorine atom or by a hydroxyl group.

An especially valuable residue Y is that of the formula

(11)
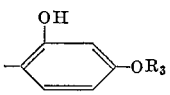

where $R_3$ represents a hydrogen atom, an alkyl group containing up to 12 carbon atoms, a hydroxyalkyl, cyanoalkyl, carboxyalkyl, carbalkoxyalkyl or an alkenyl group containing up to 4 carbon atoms, or a benzyl group which may be substituted by a chlorine atom.

The residue Z in the general Formula 2 may be, for example, the residue of the formula

(12)
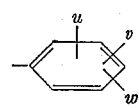

where $u$ and $v$ are identical or different and each represents a hydrogen or halogen atom, or an alkyl group or the group —$OR_1$, and $w$ stands for a hydrogen or halogen atom, for an alkyl or phenyl group or for the group —$OR_1$ (where $R_1$ has the same meaning as in the Formula 6).

Accordingly, suitable residues Z are, for example, those of the formula

(13)
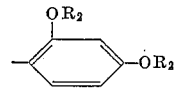

where the residues $R_2$ may be identical or different and have the same meanings as in the Formula 8.

The residue Z may also correspond to the formula

(14)
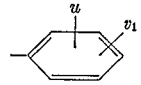

where $u_1$ represents a hydrogen atom, a halogen atom such as chlorine, or an alkyl or alkoxy group containing up to 8 carbon atoms, such as methyl, tertiary butyl, octyl or methoxy, or a phenyl group, and $v_1$ represents a hydrogen atom, a halogen atom such as chlorine, or an alkyl group containing up to 8 carbon atoms, such as methyl, tertiary butyl or octyl.

Special mention deserve the residues Z which correspond to the formula

(15)
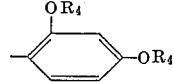

where the symbols $R_4$ may be identical or different and each represents a hydrogen atom or a residue of the formula

(16)
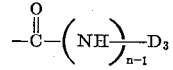

where $n$ and $D_3$ have the same meanings as in Formula 10.

Preferred residues are those of the formula

(17)
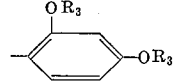

where the symbols $R_3$ are identical or different and have the same meanings as in Formula 11.

Of very special value are, however, the residues Z of the formula

(18)
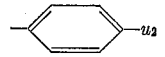

where $u_2$ represents a hydrogen or chlorine atom, an alkyl or alkoxy group containing up to 4 carbon atoms, or a phenyl group.

From among the new hydroxyphenyl-1,3,5-triazines there may be mentioned, for example, those of the formula

(19)
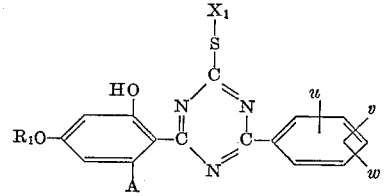

in which $X_1$ represents a hydrogen atom, an alkenyl or cycloalkyl group, a possibly substituted alkyl, phenyl or naphthyl group, or a benzazolyl group; $R_1$ represents a hydrogen atom, an alkenyl group, a possibly substituted alkyl group or a residue of the formula (7)
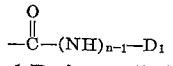

(where $n=1$ or 2 and $D_1$ is an alkyl or cycloalkyl group or a benzene residue); A represents a hydrogen atom or a residue —$OR_1$; $u$ and $v$ are identical or different and each represents a hydrogen or halogen atom, an alkyl group or the group —OR₁; and w represents a hydrogen or halogen atom, or an alkyl or phenyl group, or the residue —OR₁.

Of special practical value are hydroxyphenyl-1,3,5-triazines of the formula

(20)
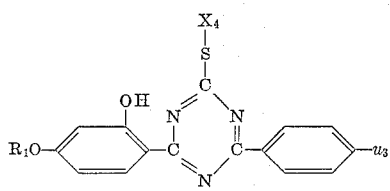

where $X_4$ represents a phenyl group, a para-chlorophenyl group, an alkylphenyl group whose alkyl group contains 1 to 4 carbon atoms, or a 2-benzthiazolyl group; $R_1$ represents a hydrogen atom, an alkenyl group, a possibly substituted alkyl group, or a residue of the formula

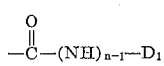

(where $n=1$ or 2 and $D_1$ stands for an alkyl or cycloalkyl group or for a benzene residue) and $u_3$ represents a hydrogen or chlorine atom.

Within this group of hydroxyphenyltriazines there may be specially mentioned those compounds which correspond to the formula

(21)
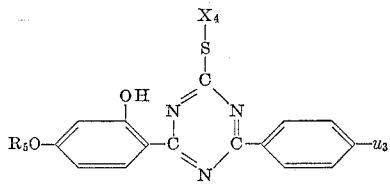

where $X_4$ represents a phenyl group, a para-chlorophenyl group, an alkylphenyl group whose alkyl group contains 1 to 4 carbon atoms, or a 2-benzthiazolyl group; $R_5$ represents a hydrogen atom, an alkyl group containing up to 12 carbon atoms, a halogenoalkyl group or a carbalkoxyalkyl group, or a benzyl group or a group of the formula

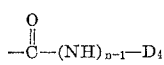

(where $n=1$ or 2 and $D_4$ is an alkyl group containing 1 to 18 carbon atoms, or a phenyl group or an alkylphenyl group containing 1 to 4 carbon atoms) and $u_3$ represents a hydrogen or chlorine atom.

Of particular value for special purposes are hydroxyphenyl-1,3,5-triazines of the formula

(22)
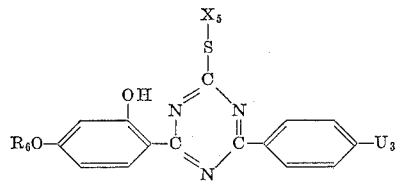

where $X_5$ represents a 2-benzthiazolyl residue, $U_3$ a hydrogen or chlorine atom, and $R_6$ a hydrogen atom or an alkyl group containing 1 to 4 carbon atoms.

Further preferred are, for example, hydroxyphenyl-1,3,5-triazines of the formula

(23)
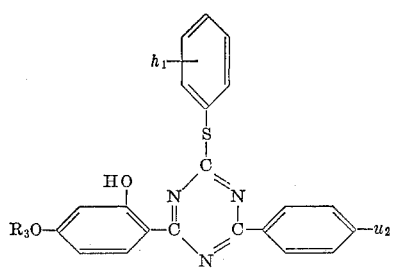

where $h_1$ represents a hydrogen or chlorine atom or an alkyl group containing up to 4 carbon atoms; $R_3$ represents a hydrogen atom, a hydroxyalkyl, cyanoalkyl, carboxyalkyl, carbalkoxyalkyl or an alkenyl group containing up to 4 carbon atoms, or a benzyl group which may be substituted by a chlorine atom, and $u_2$ represents a hydrogen or chlorine atom, or an alkyl or alkoxy group containing up to 4 carbon atoms, or a phenyl group.

The new hydroxyphenyl-1,3,5-triazines of the Formula 2 are obtained by known methods, for example by reacting one mol of a dihalogeno-1,3,5-triazine of the formula

(24)
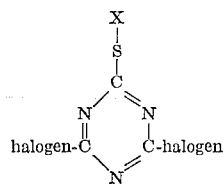

(where X has the same meaning as in the Formula 2) with one or two mols of a compound of the benzene series containing two hydroxy groups in meta-position relatively to each other, or by reacting one molecular proportion each of a monohalogeno-1,3,5-triazine of the formula

(25)
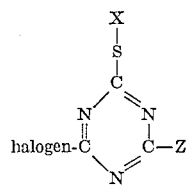

(where X and Z have the same meanings as in the Formula 2) and of a compound of the benzene series containing two hydroxyl groups in meta-position relatively to each other, in an anhydrous medium in the presence of a Friedel-Crafts catalyst, especially aluminum chloride, and of an inert organic solvent, especially nitrobenzene, whereupon, if desired, the resulting compound is etherified with a suitable halide, especially a bromide, in an inert solvent in the presence of an acid acceptor, or further reacted in the presence of a tertiary amine and of an inert organic solvent with an isocyanate, acid halide or acid anhydride, in a manner such that a compound of the formula shown above is formed.

The dihalogenotriazines and monohalogenotriazines to be used in the above reactions are either known or can be prepared by known methods. Thus, the dihalogenotriazines of the Formula 24 are obtained, for example, by reacting an equimolecular solution of cyanuric chloride and of a thiophenol or mercaptan of the formula

(26)  X—SH (where X has the above meaning), in an inert organic solvent, e.g. in acetone, at a temperature of about 0° C. with an equivalent proportion of a basic reagent, such as sodium hydroxide, in a manner such that the pH value always remains acidic or weakly alkaline.

The monohalogenotriazines of the Formula 25 are obtained in a similar manner by replacing in the reaction described above cyanuric chloride by an aryldichlorotriazine of the formula

(27)
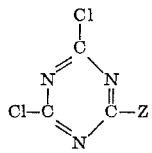

(where Z has the above meaning) and performing the reaction within the temperature range from 20 to 70° C.

As examples of aryldichlorotriazines of the Formula 27 there may be mentioned:

2,4-dichloro-6-phenyl-triazine,
2,4-dichloro-6-diphenyl-triazine,
2,4-dichloro-6-(p-methoxyphenyl)-triazine,
2,4-dichloro-6-(p-methylphenyl)-triazine,
2,4-dichloro-6-(o, p-dimethylphenyl)-triazine,
2,4-dichloro-6-(p-chlorphenyl)-triazine.

As mercaptans or thiophenols of the Formula 26 there may be used, for example:

methylmercaptan
n-octylmercaptan
n-octadecylmercaptan
tertiary butylmercaptan
isopropylmercaptan
CH₂=CH—CH₂—SH

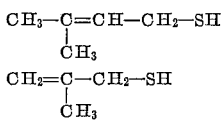

cyclohexylmercaptan
H₅C₂—CH₂—CH₂—SH
CH₃—CH₂—CH₂—S—CH₂—CH₂—SH
Cl₂HC—CH₂—CH₂—SH
CH₃OOC—CH₂—SH
C₂H₅OOC—CH₂—SH
C₆H₅—CH₂—SH
2-mercaptobenzthiazole
2-mercaptobenzoxazole
2-mercaptobenzimidazole
thiophenol
o-, m-, p-methylthiophenol
2,4-dimethylthiophenol
p-chlorothiophenol From among the compounds of the benzene series that contain two hydroxyl groups in meta-position relatively to each other there may be mentioned, for example, 2,6-dihydroxytoluene, 1,3,5-trihydroxybenzene and especially 1,3-dihydroxybenzene.

Thus, for example, hydroxyphenyl-1,3,5-triazines of the formula (28)

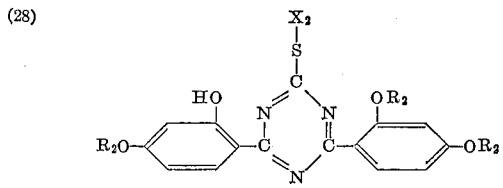

where X₂ represents a hydrogen atom, an alkyl group containing up to 18 carbon atoms or a 2-benzthiazolyl, 2-benzoxazolyl or 2-benzimidazolyl group, and the symbols R₂ are identical or different and each stands for a hydrogen atom, an alkyl group containing up to 18 carbon atoms which may be substituted by a chlorine atom, or by a hydroxyl, cyano, carboxyl, carbalkoxy or carbamyl group, an aralkyl or alkenyl group containing up to 9 carbon atoms, or a residue of the formula

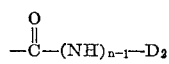

where n=1 or 2 and D₂ represents an alkyl group containing up to 18 carbon atoms or a phenyl group which may be substituted by a chlorine atom, or by a phenyl or hydroxyl group, or by an alkyl or alkoxy group contain- ing up to 8 carbon atoms, are obtained when one mol of a halogenotriazine of the formula (29)

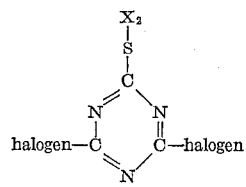

(where halogen is chlorine or bromine and X₂ has the above meaning) is reacted in an anhydrous medium in the presence of 0.6 to 4.0 mols of a Friedel-Crafts catalyst and in an organic solvent that is inert towards the reactants, with two mols of a 1,3-dihydroxybenzene between 0° and 150° C. and, if desired, any hydroxyl groups of the dihydroxybenzene residues in para-position to the bond with the triazine ring are etherified, esterified or converted into a urethane group.

Hydroxyphenyl-1,3,5-triazines of the formula (30)

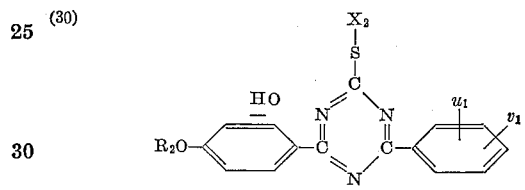

where X₂ represents a hydrogen atom, an alkyl group containing up to 18 carbon atoms, or a 2-benzthiazolyl, 2-benzoxazolyl or 2-benzimidazolyl group, and R₂ represents a hydrogen atom, or an alkyl group which contains up to 18 carbon atoms and may be substituted by a chlorine atom, or by a hydroxyl, cyano, carboxyl carbalkoxy or carbamyl group, an aralkyl or alkenyl group containing up to 9 carbon atoms, or a residue of the formula

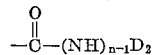

(where n=1 or 2 and D₂ represents an alkyl group containing up to 18 carbon atoms, or a phenyl group which may be substituted by a chlorine atom, or by a phenyl or hydroxyl group or by an alkyl or alkoxy group containing up to 8 carbon atoms); u₁ represents a hydrogen or halogen atom, or an alkyl or alkoxy group containing up to 8 carbon atoms, or a phenyl group; and v₁ represents a hydrogen or halogen atom or an alkyl group containing up to 8 carbon atoms, are obtained, for example, when one mol of a halogenotriazine of the formula (31)

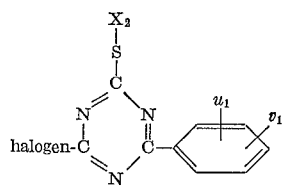

where halogen is chlorine or bromine and the symbols X₂, u₁ and v₁ have the above meanings, is reacted in an anhydrous medium in the presence of 0.3 to 3.0 mols of a Friedel-Crafts catalyst and of an organic solvent that is inert towards the reactants with one mole of a 1,3-dihydroxybenzene between 0° and 150° C. and, if desired, the hydroxyl group of the dihydroxybenzene residue in para-position to the bond with the triazine ring is etherified, esterified or converted into a urethane group.

Hydroxyphenyl-1,3,5-triazines of the formula

(32) 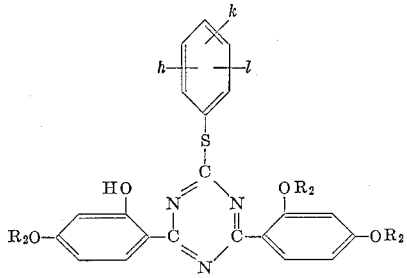

where $h$ and $k$ are identical or different and each represents a hydrogen or halogen atom or an alkyl group containing up to 8 carbon atoms; $l$ represents a hydrogen or halogen atom or an alkyl group containing up to 8 carbon atoms, or a thio, carboxyl, nitro, amino or phenyl group, or a carbalkoxy or alkoxy group containing up to 8 carbon atoms; and the symbols $R_2$ are identical or different and each represents a hydrogen atom, or an alkyl group which contains up to 18 carbon atoms and may be substituted by a chlorine atom or by a hydroxyl, cyano, carboxyl, carbalkoxy or carbamyl group, or an aralkyl or alkenyl group containing up to 9 carbon atoms or a residue of the formula

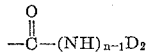

(where $n=1$ or 2 and $D_2$ is an alkyl group containing up to 18 carbon atoms or a phenyl group which may be substituted by a chlorine atom or by a phenyl or hydroxyl group or by an alkyl or alkoxy group containing up to 8 carbon atoms) are obtained, for example, when one mol of a halogenotriazine of the formula

(33) 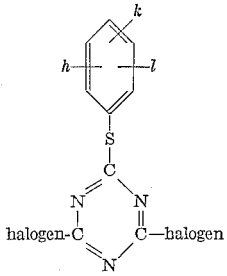

(where halogen is chlorine or bromine, and the symbols $h$, $k$ and $l$ have the above meanings) is reacted with two mols of a 1,3-dihydroxybenzene between 0° and 150° C. in an anhydrous medium in the presence of 0.6 to 4.0 mols of a Friedel-Crafts catalyst and an organic solvent that is inert towards the reactants and, if desired, the hydroxyl groups of the dihydroxybenzene residues in para-position to the bond with the triazine ring are etherified, esterified or converted into a urethane group.

In a similar manner hydroxyphenyl-1,3,5-triazines of the formula

(34) 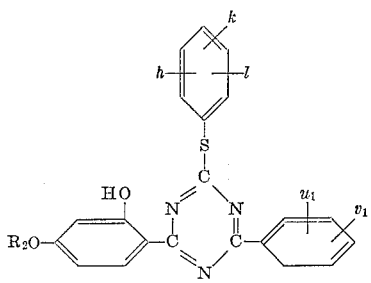

where $h$ and $k$ are identical or different and each represents a hydrogen or halogen atom or an alkyl group containing up to 8 carbon atoms; $l$ is a hydrogen or halogen atom, or an alkyl group containing up to 8 carbon atoms, or a thio, carboxyl, nitro, amino or phenyl group, or a carbalkoxy or alkoxy group containing up to 8 carbon atoms; $R_2$ represents a hydrogen atom, or an alkyl group containing up to 18 carbon atoms which may be substituted by a chlorine atom or by a hydroxyl, cyano, carboxyl, carbalkoxy or carbamyl group, an aralkyl or alkenyl group containing up to 9 carbon atoms or a residue of the formula

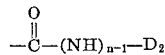

(where $n=1$ or 2 and $D_2$ is an alkyl group containing up to 18 carbon atoms or a phenyl group which may be substituted by a chlorine atom or by a phenyl group or hydroxyl group or by an alkyl or alkoxy group containing up to 8 carbon atoms); $u_1$ is a hydrogen or halogen atom, or an alkyl or alkoxy group containing up to 8 carbon atoms or a phenyl group, and $v_1$ stands for a hydrogen or halogen atom or for an alkyl group containing up to 8 carbon atoms, are obtained when one mol of a halogenotriazine of the formula

(35) 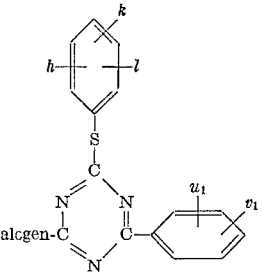

(where halogen is chlorine or bromine and the symbols $h$, $k$, $l$, $u_1$ and $v_1$ have the above meanings) is reacted with one mol of a 1,3-dihydroxybenzene in an anhydrous medium in the presence of 0.3 to 3.0 mols of a Friedel-Crafts catalyst and an organic solvent that is inert towards the reactants, at a temperature from 0° to 150° C. and, if desired, the hydroxyl group of the dihydroxybenzene residue in para-position to the bond with the triazine ring is etherified, esterified or converted into a urethane group.

According to a slightly different process hydroxyphenyl-1,3,5-triazines of the formula

(36) 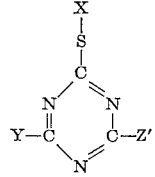

(where X represents a hydrogen atom or an organic residue which is bound to the sulphur atom through a carbon atom; Y represents a benzene residue which is linked with the triazine ring directly through a cyclic carbon atom and contains in ortho-position to the bond with the triazine ring a hydroxyl group and in para-position a possibly etherified hydroxyl group or the group

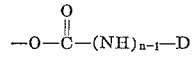

[where $n=1$ or 2 and D is an organic residue] and Z' represents a benzene residue) are obtained when 2-aryl-4-halogeno-6-resorcinyl-triazines of the formula

(37) 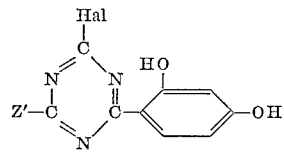

where Z' is a possibly substituted benzene residue and Hal represents a halogen atom, are reacted in an anhydrous organic solvent that is inert towards the reactants, if desired or required in the presence of a Friedel-Crafts catalyst or acid acceptor with mercaptans or thiophenols or with alkali metal salts thereof and then, if desired, the resorcinyl residue in para-position is etherified, esterified or converted into a urethane group.

Hydroxyphenyl-1,3,5-triazines of the formula (20)

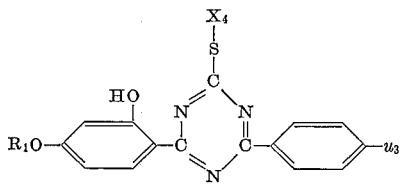

where $X_4$ represents a phenyl group, a para-chlorophenyl group, an alkylphenyl group whose alkyl group contains 1 to 4 carbon atoms, or a benzthiazolyl group; $R_1$ represents a hydrogen atom, an alkenyl group, or a possibly substituted alkyl group, or a residue of the formula

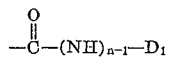

(where $n=1$ or 2 and $D_1$ is an alkyl or cycloalkyl group or a benzene residue) and $u_3$ represents a hydrogen or chlorine atom, are obtained, for example, when one mol of a halogenotriazine of the formula (38)

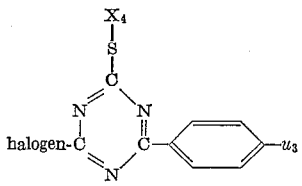

(where halogen is chlorine or bromine, and the symbols $X_4$ and $u_3$ have the above meanings) is reacted in an anhydrous medium in the presence of 0.3 to 3.0 mols of a Friedel-Crafts catalyst, especially aluminum chloride, and an organic solvent that is inert towards the reactants, with one mol of a 1,3-dihydroxybenzene at a temperature ranging from 10° to 150° C. and, if desired, the hydroxyl group of the dihydroxybenzene residue in para-position to the bond with the triazine ring is etherified, esterified or converted into a urethane group.

In a similar manner hydroxyphenyl-1,3,5-triazines of the formula (21)

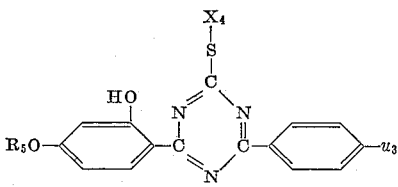

where $X_4$ represents a phenyl group, or a para-chlorophenyl group, an alkylphenyl group whose alkyl group contains 1 to 4 carbon atoms, or a benzthiazolyl group; $R_5$ represents a hydrogen atom, an alkyl group, halogenoalkyl or carbalkoxyalkyl group, containing up to 12 carbon atoms, or a benzyl group or a group of the formula

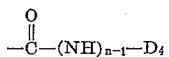

(where $n=1$ or 2 and $D_4$ is an alkyl group containing 1 to 18 carbon atoms, a phenyl group, or an alkylphenyl group whose alkyl residue contains 1 to 4 carbon atoms) and $u_3$ represents a hydrogen or chlorine atom, are obtained when one mol of a halogenotriazine of the formula (38)

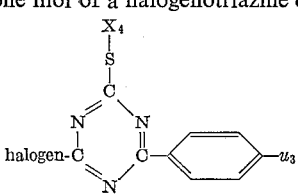

(where halogen is chlorine or bromine and the symbols $X_4$ and $u_3$ have the above meanings) is reacted in an anhydrous medium in the presence of 0.3 to 3.0 mols of a Friedel-Crafts catalyst, especially aluminum chloride, and an organic solvent that is inert towards the reactants, with one mol of a 1,3-dihydroxybenzene between 10° and 150° C. and, if desired, the hydroxyl group of the dihydroxybenzene residue in para-position to the bond with the triazine ring is etherified, esterified or converted into a urethane group.

Finally, hydroxyphenyl-1,3,5-triazines of the formula (22)

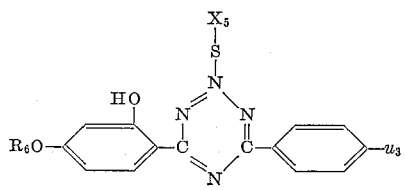

where $X_5$ represents a 2-benzthiazolyl residue, $u_3$ a hydrogen or chlorine atom and $R_6$ a hydrogen atom or an alkyl group containing 1 to 4 carbon atoms, are obtained by reacting one mol of a halogenotriazine of the formula (39)

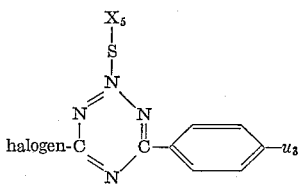

(where halogen is chlorine or bromine and the symbols $X_5$ and $u_3$ have the above meanings) in an anhydrous medium in the presence of 0.3 to 3.0 mols of a Friedel-Crafts catalyst, especially aluminum chloride, and an organic solvent that is inert towards the reactants, with one mol of a 1,3-dihydroxybenzene at 10° to 150° C. and, if desired, the hydroxyl group of the dihydroxybenzene residue in para-position to the bond with the triazine ring is etherified.

The above-mentioned hydroxyphenyl-1,3,5-triazines are also obtained when a 2-aryl-4-halogeno-6-resorcinyltriazine of the formula (40)

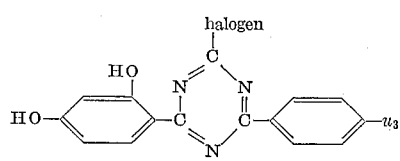

where halogen is chlorine or bromine and $u_3$ has the above meaning, is reacted in an anhydrous organic solvent that is inert towards the reactants, if desired in the presence of an acid acceptor, with 2-mercaptobenzthiazole or with an alkali metal salt thereof and then, if desired, the resorcinyl residue in para-position is etherified.

As examples of Friedel-Crafts catalysts suitable for the reaction of the halogenotriazines with the 1,3-dihydroxybenzenes there may be mentioned sodium-aluminum fluoride, tin tetrachloride, boron trifluoride, ferric chloride and aluminum tribromide, and especially aluminum trichloride, using 0.3 to 3.0 mols, preferably 0.8 to 1.5 mols, of the catalyst per mol of a 1,3-dihydroxybenzene. The 1,3-dihydroxybenzenes are most advantageously used in stoichiometric proportions, or if desired in a small excess, though this is not a limiting factor insofar as the course taken by the reaction is concerned.

Suitable inert solvents are e.g. methylenechloride, dichloroethane, tetrachloroethane, tetrachloroethylene, dichlorobenzene, carbon disulphide and nitrobenzene. The reaction may be performed at a temperature ranging from 0° C. to 150° C., preferably from 15° C. to 100° C. In the case of low-boiling solvents their reflux temperature is preferred.

It was quite unexpected that it would be possible to manufacture the present hydroxyphenyl-1,3,5-triazines by a Friedel-Crafts reaction of suitable halogenotriazines substituted by thio groups with 1,3-dihydroxybenzenes, since it is generally known that e.g. aluminum chloride may be used for splitting ether or thioether bonds. It could not have been foreseen that in the present case even under energetic reaction conditions the thio group would not be split off or at most only to a minimal extent.

The compounds obtained in the manner described above contain one or two 2',4'-dihydroxyphenyl groups. Whereas, as is known, the functional modification of a single hydroxyl group in 1,3-dihydroxybenzenes takes a little selective course and gives poor yields, it is possible to convert the hydroxyl groups in the 4'-position of the above 2',4'-dihydroxyphenyltriazines by known methods into ether, ester or urethane groups with a high selectivity and in a good yield.

The etherification can be carried out, for example, with halides, especially bromides, such as ethylenechlorohydrin, n-allylbromide, n-bromooctane, n-bromooctadecane, benzylchloride, para-chlorobenzylchloride, crotylbromide, γ-bromobutyronitrile, chloroacetic acid ethyl ester, γ-bromobutyric acid ethyl ester, 1-chloro-3-bromopropane, phenacylbromide, bromoacetic acid methyl ester, bromoacetic acid or bromopropionic acid amide, or with alkylating agents such as dimethyl or diethyl sulphate, which are used in an inert solvent system such as acetone, aqueous acetone, methylethylketone, dioxane, dimethyl formamide or dimethyl sulphoxide in the presence of a preferably stoichiometric proportion of an acid acceptor, such as potassium carbonate or sodium hydroxide, at a temperature ranging from 20° to 100° C.

The isocyanates suitable for conversion into the urethane group correspond e.g. to the formula D—N=C=O where D has the same meaning as in Formula 3. As relevant examples there may be mentioned methylisocyanate,
n-butyl-isocyanate,
dodecyl-isocyanate,
octadecyl-isocyanate,
cyclohexyl-isocyanate,
phenyl-isocyanate,
p-ethoxyphenyl-isocyanate,
p-chlorophenyl-isocyanate,
o-tolyl-isocyanate,
p-tolyl-isocyanate.

The reaction is best performed in the presence of a tertiary amine, if desired in an inert organic solvent such as benzene.

The esterification is performed, for example, with an acid halide or acid anhydride, for example of the formula

(41)
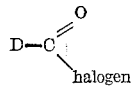

or
(42)
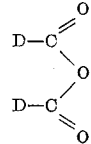

where D has the same meaning as in Formula 3.

As suitable acid halides of the Formula 41 and acid anhydrides of the Formula 42 there may be mentioned, for example, those of the following acids:

acetic acid,
butyric acid,
stearic acid,
benzoic acid,
salicylic acid,
p-chlorobenzoic acid,
p-tertiary butylbenzoic acid.

The reaction may be performed in the presence of a tertiary amine, such as pyridine, if desired in the presence of an inert solvent such as acetone, at a temperature ranging from 0° C. to the boiling point of the system, preferably from 15° C. to 100° C. Alternatively, the esterification may be carried out in a high-boiling solvent such as toluene, chlorobenzene or dichlorobenzene in the absence of a tertiary amine with an acid anhydride or acid halide at a temperature from 80° C. to 170° C.; in the case of the acid halides the hydrogen halide formed escapes from the system in the form of a gas.

The new hydroxyphenyl-1,3,5-triazines of the above composition may be used as stabilizers for a wide variety of organic materials.

Accordingly, the present invention includes also a process for protecting organic materials from the harmful effects of heat, air and ultraviolet rays with the use of the new hydroxyphenyl-1,3,5-triazines of the Formula 2.

Quite generally, there are three different ways of using the new products, either separately or in combinations:

(A) The stabilizer is incorporated with a substrate to protect the latter from the attack by ultraviolet rays, so as to prevent a change in one or more physical properties, for example discoloration, impairment of the tear strength, embrittlement or the like and/or chemical reactions triggered off by ultraviolet rays, for example oxidation. The incorporation may take place before or during the manufacture of the substrate or subsequently by a suitable operation, for example for a fixing operation similar to a dyeing process.

(B) The stabilizer is incorporated with a substrate in order to protect one or more other substances contained in the substrate, for example dyestuffs, assistants or the like. The protection of the substrate described under (A) above may be achieved at the same time.

(C) For use as light filter the stabilizer is incorporated with a "filter layer" for the purpose of protecting a substrate placed directly underneath or at a distance from it (for example in a shop window) from the attack by ultraviolet rays. The filter layer may be solid (a film, foil or dressing) or semi-solid (a cream, oil or wax).

Thus, the process for protecting organic materials from the harmful effects of heat, air and especially ultraviolet rays consists in incorporating a new hydroxyphenyl-1,3,5-triazine of the Formula 2 with, or fixing on, the organic material to be protected itself or a substrate containing the said material or a filter layer placed on top of the material to be protected.

As examples of organic materials that can be protected there may be mentioned:

(a) Textile materials quite generally, which may be in any desired form e.g. in the form of fibres, filaments, yarns, woven or knitted fabrics or as felt, and all articles manufactured therefrom; such textile materials may consist of natural materials of animal origin, such as wool or silk, or of vegetable origin such as cellulose materials from cotton, hemp, flax, linen, jute and ramie; also of semi-synthetic materials such as regenerated cellulose, for example rayon, viscoses including spun rayon, or synthetic materials accessible by polymerization or copolymerization, for example polyacrylonitrile, polyvinyl chloride or polyolefines such as polyethylene and polypropylene, or those which are accessible by polycondensation, such as polyesters and above all polyamides, or polyadducts such, for example, as polyurethanes. In the case of semi-synthetic materials it is of advantage to incorporate the protective agent already with a spinning mass, for example a viscose spinning mass, acetyl cellulose spinning mass (including cellulose triacetate) and masses destined for the manufacture of fully synthetic fibres, such as polyamide melts or polyacrylonitrile spinning masses, before, during or after the polycondensation or polymerization respectively.

(b) Other fibrous materials not being textile materials; they may be of animal origin such as feathers, hairs and pelts or hides and leathers made from the latter by natural or chemical tanning, as well as manufactured goods made therefrom; also materials of vegetable origin such as straw, wood, wood pulp or fibrous materials consisting of densified fibres, more especially paper, cardboard or hardboard, as well as finished products made from the latter. Also paper pulps used in the manufacture of paper (for example Hollander pulps).

(c) Coating and dressing agents for textiles and papers, for example those based on starch or casein or on synthetic resins, for example from vinylacetate or derivatives of acrylic acid.

(d) Lacquers and films of diverse composition, for example those from acetylcellulose, cellulose propionate, cellulose butyrate or cellulose mixtures, for example cellulose acetate+butyrate and cellulose acetate+propionate; also nitrocellulose, vinylacetate, polyvinyl chloride, polyvinylidene chloride, copolymers of vinyl chloride and vinylidene chloride, alkyd lacquers, polyethylene, polypropylene, polyamides, polyacrylonitrile, polyesters and the like. Another way of using the hydroxyphenyl-1,3,5-triazines is their incorporation with wrapping materials, more especially the known transparent foils of regenerated cellulose (viscose) or acetylcellulose. In this case it is as a rule advantageous to add the protective agent to the mass from which these foils are manufactured.

(e) Natural or synthetic resins, for example epoxy resins, polyester resins, vinyl resins, polystyrene resins, alkyd resins, aldehyde resins such as formaldehyde condensation products with phenol, urea or melamine; as well as emulsions of synthetic resins (for example oil-in-water or water-in-oil emulsions). In this case it is of advantage to add the protective agent before or during the polymerization or polycondensation respectively. Furthermore, there may be mentioned synthetic resins reinforced with glass fibres and laminates made therefrom.

(f) Hydrophobic susbtances containing oil, fat or wax, such as candles, floor polishes, floor stains or other wood stains, furniture polishes, especially those destined for the treatment of light-coloured, possibly bleached, wood surfaces.

(g) Natural rubber-like materials such as rubber, balata, gutta-percha or synthetic, vulcanizable materials such as polychloroprene, olefinic polysulphides, polybutadiene or copolymers of butadiene+styrene (for example Buna S) or butadiene+acrylonitrile (for example Buna N) which may also contain fillers, pigments, vulcanization accelerators and the like, and in whose case the addition of the hydroxyphenyl-1,3,5-triazines aims at delaying the ageing and thus at preventing changes in the plasticity properties and embrittlement.

(h) Cosmetic preparations such as perfumes, dyed or undyed soaps and bath salts, skin and face creams, powders, repellants and especially sunburn oils and creams.

It goes without saying that the hydroxyphenyl-1,3,5-triazines are suitable as protective agents not only for undyed but also for dyed or pigmented materials; in this application the protection extends also to the dyestuffs, whereby in some cases very substantial improvements of the fastness to light are achieved. If desired, the treatment with the protective agent and the dyeing or pigmenting process may be combined.

Depending on the kind of material to be treated, demands made on the efficiency and durability and other requirements, the amount of the stabilizer to be incorporated with the material to be treated may be varied within rather wide limits, for example from about 0.01 to 10%, preferably from 0.1 to 2%, of the weight of the material which is to be directly protected from the harmful effects of heat, air and especially ultraviolet rays.

It may be mentioned that hydroxyphenyl-1,3,5-triazines of the above Formula 2 have not only stabilizing properties for organic materials but act also as fungicides and/or bactericides.

Unless otherwise indicated, parts and percentages in the following examples are by weight. Melting points are uncorrected.

EXAMPLE 1

A solution of 68 parts of 2-octylmercapto-4,6-dichloro-1,3,5-triazine in 300 parts of nitrobenzene is mixed with 51 parts of resorcinol and then with 65 parts of aluminium trichloride, making sure that the temperature does not exceed 30° C. The mixture is then stirred for 20 hours at 30° C., poured into 1000 parts of water and the aqueous phase is washed and decanted until it gives a neutral reaction. After having removed the nitrobenzene by steam distillation, there are obtained about 95 parts of yellow crystals corresponding to the formula

(43) 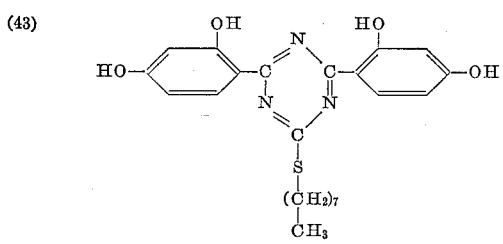

After three recystallizations from aqueous acetone, ethyl acetate+hexane and finally aqueous alcohol, the resulting analytically pure product melts at 223 to 224° C.

$C_{23}H_{27}O_4N_3S$ calculated: C, 62.56; H, 6.16; N, 9.52%.
Found: C, 62.77; H, 6.23; N, 9.44%.

EXAMPLE 2

8.8 Parts of the compound of the Formula 43 are dissolved in 70 parts of acetone containing 1.6 parts of caustic soda and 10 parts of 2 N-sodium carbonate solution, and the solution is mixed at 20° C. with 6.2 parts of diethyl sulphate. The batch is then stirred for 5 hours at 45° C, whereupon the product of the formula

(44) 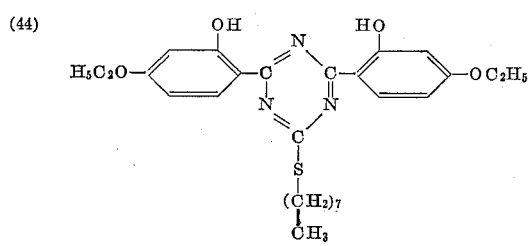

crystallizes out of the solution after only ½ hour; it is suctioned off and crystallized once more from methylene-chloride+methanol. The analytically pure product melts at 124.5° to 125° C.

$C_{27}H_{35}O_4N_3S$ calculated: C, 65.16; H, 7.08; N, 8.44%.
Found: C, 64.80; H, 7.15; N, 8.31%.

EXAMPLE 3

A solution of 13 parts of 2-phenylmercapto-4,6-dichloro-1,3,5-triazine and 12 parts or resorcinol in 100 parts of nitrobenzene is mixed at 40° C. with 14 parts of aluminium chloride, and the batch is then kept for 20 hours at 40° C. For working up it is poured into 500 parts of water, stirred for ½ hour and the resulting emulsion is subjected to steam distillation. The solid substance which forms is suctioned off and repeatedly recrystallized from aqueous alcohol. The product of the formula

(45)
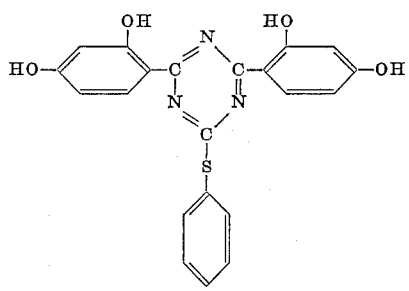

is hygroscopic and crystallizes with a different content of water of crystallization depending on the degree of drying. It melts at 289.5° C. with decomposition.

$C_{21}H_{15}O_4N_3S:\frac{2}{3}H_2O$ calculated: C, 60.40; H, 3.93; N, 10.05%. Found: C, 60.51; H, 4.22; N, 10.23%.

EXAMPLE 4

A solution of 90 parts of 2-phenyl-4-phenylmercapto-6-chloro-1,3,5-triazine and 35 parts of resorcinol in 200 parts of nitrobenzene is mixed with 41 parts of aluminium chloride at a rate such that the reaction temperature does not rise above 30° C. When all aluminium chloride has been added, the batch is stirred overnight at 30° C., the temperature is then raised to 50° C. and so kept for 1 hour. For working up the batch it is poured into 500 parts of water, the organic solvent expelled with steam, and the residue is suctioned off and dried. Crude yield: 113.4 parts. The analytically pure product of the formula

(46)
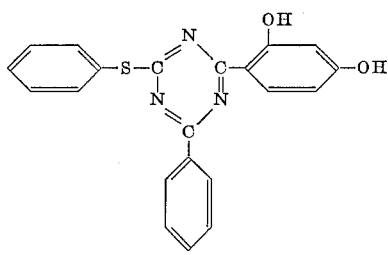

melts after 5 recrystallizations from aqueous alcohol at 230.5 to 231° C.

$C_{21}H_{15}O_2N_3S$ calculated: C, 67.54; H, 4.05; N, 11.25%. Found: C, 67.57; H, 4.11; N, 11.32%.

EXAMPLE 5

11.2 parts of the compound of the Formula 46 are dissolved at 45° C. together with 1.2 parts of caustic soda and 3.2 parts of soda in 70 parts of acetone containing 7 parts of water. This reaction solution is mixed at 20° C. with 4.4 parts of diethyl sulphate, the temperature raised to 50° C. and kept so for 5 hours. The batch is then cooled to room temperature and the crude product of the formula (1)
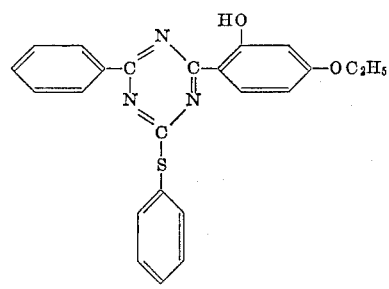

is suctioned off and recrystallized from benzene+alcohol until it is analytically pure. It melts at 183.5 to 184.5° C.

$C_{23}H_{19}O_2N_3S$ calculated: C, 68.81; H, 4.77; N, 10.47%. Found: C, 68.74; H, 4.85; N, 10.35%.

EXAMPLE 6

A solution of 11.2 parts of the compound of the Formula 46 and 4.2 parts of potassium hydroxide in 200 parts of acetone is mixed at room temperature with 5.1 parts of bromoacetic acid ethyl ester, and the batch is stirred for 3 days under reflux. For working up the reaction mixture is poured into 500 parts of water, and the precipitate is suctioned off and dried. Crude yield: 13.9 parts. The analytically pure product obtained by recrystallization from benzene+methanol corresponds to the formula

(47)
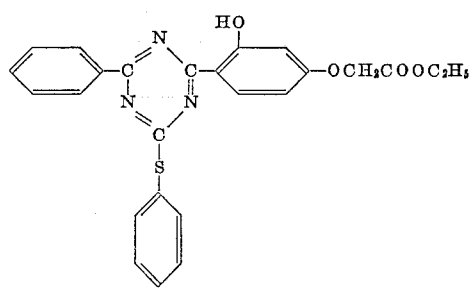

and melts at about 120° C. with decomposition.

$C_{25}H_{21}O_4N_3S$ calculated: C, 65.34; H, 4.61; N, 9.14%. Found: C, 65.46; H, 4.80; N, 9.56%.

EXAMPLE 7

When bromoacetic acid ethyl ester in Example 6 is replaced by an equivalent quantity of benzylbromide, the product of the formula

(48)
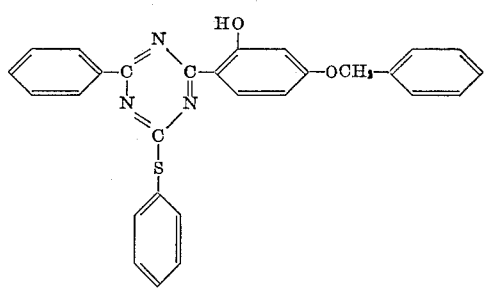

is obtained in a similar yield and purity. The analytically pure product obtained by recrystallization from benzene+methanol melts at 155 to 160° C.

$C_{28}H_{21}O_2N_3S$ calculated: C, 72.55; H, 4.57; N, 9.07%. Found: C, 72.57; H, 4.46; N, 9.41%.

EXAMPLE 8

A solution of 9.35 parts of the compound of the Formula 46 in pyridine is mixed at room temperature with 10 parts of acetic anhydride and then left to itself overnight. For working up it is poured over ice-water and the precipitate is suctioned off. The analytically pure product obtained by recrystallization from benzene+methanol of the formula

(49)
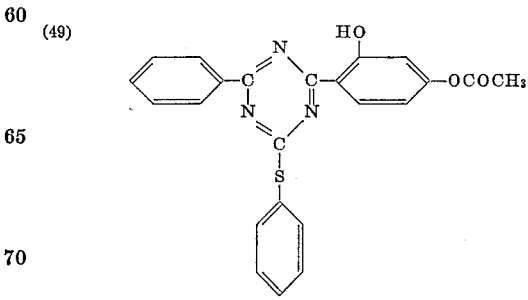

melts at 190.5 to 191° C.

$C_{23}H_{17}O_3N_3S$ calculated: C, 66.49; H, 4.12; N, 10.11%. Found: C, 66.58; H, 4.25; N, 10.16%.

EXAMPLE 9

When in Example 8 five parts of benzoylchloride are used instead of acetic anhydride, the product of the formula

(50)
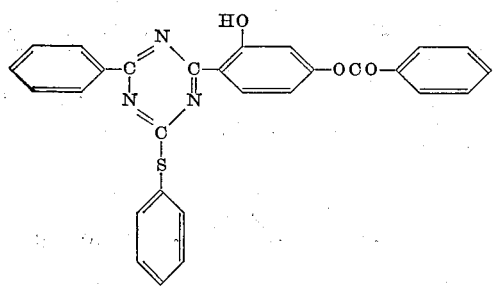

is obtained; it melts at 166 to 166.5° C.

$C_{28}H_{19}O_3N_3S$ calculated: C, 70.42; H, 4.01; N, 8.80%. Found: C, 70.27; H, 4.11; N, 8.72%.

EXAMPLE 10

9.35 parts of the compound of the Formula 46 together with 10 parts of triethylamine are dissolved in 120 parts of benzene. 10 parts of octadecyl isocyanate are then dropped in and the reaction solution is stirred for 3 hours at 80° C. and then for working up cooled to room temperature. Crystallization sets in and is accelerated by adding 150 parts of petroleum ether. The precipitated product of the formula

(51)
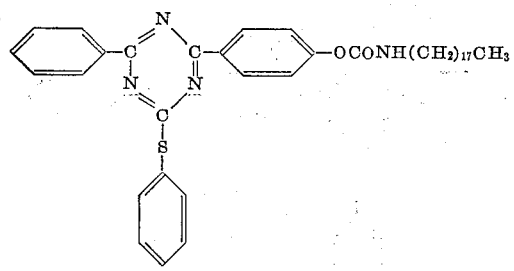

is suctioned off, washed with petroleum ether, freed from residual starting material by being stirred for half an hour with 100 parts of methanol, again suctioned and rinsed on the filter with 50 parts of methanol. Yield: 14.8 parts. Melting point: 161 to 163° C.

$C_{40}H_{52}O_3N_4S$ calculated: C, 71.82; H, 7.84; N, 8.38%. Found: C, 71.80; H, 7.95; N, 8.56%.

EXAMPLE 10a

When octadecyl isocyanate is replaced in Example 10 by an equivalent quantity of ethyl isocyanate, the product of the formula

(52)
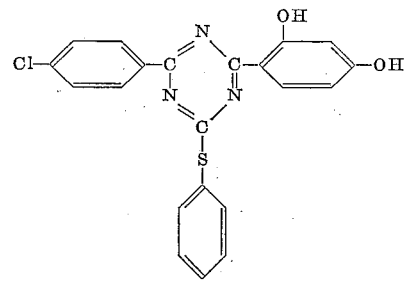

is obtained in a similar yield and purity. The analytically pure product obtained by one recrystallization from dimethylformamide+methanol melts at 191 to 197° C. with decomposition.

$C_{24}H_{20}O_3N_4S$ calculated: C, 64.85; H, 4.54; N, 12.60%. Found: C, 64.83; H, 4.66; N, 12.53%.

EXAMPLE 10b

When in Example 10 octadecyl isocyanate is replaced by an equivalent quantity of phenyl isocyanate, the product of the formula

(53)
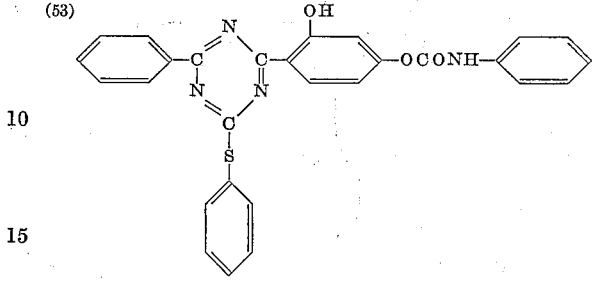

is obtained in a similar yield and purity. The analytically pure product obtained by two recrystallizations from dimethylformamide+methanol melts at 192° C. with decomposition.

$C_{28}H_{20}O_3N_4S$ calculated: C, 68.28; H, 4.09; N, 11.37%. Found: C, 68.50; H, 4.20; N, 11.30%.

EXAMPLE 11

A mixture of 34 parts of 2-para-chlorophenyl-4-thiophenoxy-6-chloro-1,3,5-triazine, 130 parts of resorcinol, 130 parts of aluminium chloride and 1800 parts of benzene is stirred for 16 hours at 50° C. The resulting yellowish red magma is decomposed by being poured over ice-water, and the organic solvent expelled with steam. After drying in vacuo at 100° C., the product of the formula

(54)
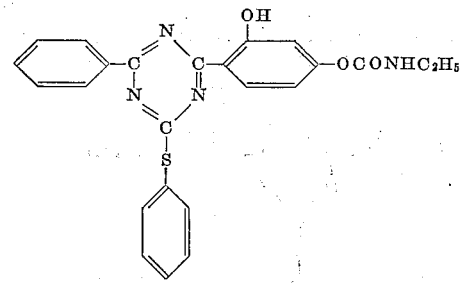

is obtained in a crude yield of 400 parts. The analytically pure product obtained by three recrystallizations from acetone+hexane melts at 209.5 to 210.5° C., and reveals the following analytical data.

$C_{21}H_{14}O_2N_3ClS$ calculated: C, 61.84; H, 3.46; N, 10.30%. Found: C, 62.13; H, 3.46; N, 10.38%.

EXAMPLE 12

1.2 parts of sodium hydroxide in 4 parts of water and 15 parts of 2 N-sodium carbonate solution are added to a solution of 12.3 parts of the compound of the Formula 54 in 100 parts of acetone, and 3.9 parts of dimethyl sulphate are dropped into the mixture at room temperature. The batch is then stirred for 4 hours at 40 to 45° C., then cooled to 10° C. and the precipitate of the formula (55)

Cl—⟨⟩—C=N—C—⟨⟩—OCH₃ is suctioned off, rinsed with methanol and dried under vacuum at 100° C. Yield: 13.1 parts. The analytically pure product obtained by three recrystallizations from benzene+methanol melts at 170 to 176° C. and displays the following data.

$C_{22}H_{16}O_2N_3ClS$ calculated: C, 62.63; H, 3.82; N, 9.96%. Found: C, 62.90; H, 3.70; N, 10.10%.

EXAMPLE 13

A mixture of 10.2 parts of the compound of the Formula 54, 3.5 parts of potassium carbonate, 8 parts of n-bromododecane and 70 parts of methylethylketone is stirred for 16 hours at 80° C. The initially clear solution turns gradually into a magma which is difficult to stir as the reaction progresses. For working up the reaction mixture is mixed with 100 parts of methanol, then suctioned and rinsed with methanol. Crude yield: 8.85 parts.

The analytically pure product obtained by chromatography on alumina I with benzene+cyclohexane (1:1) and recrystallization from benzene+methanol, of the formula

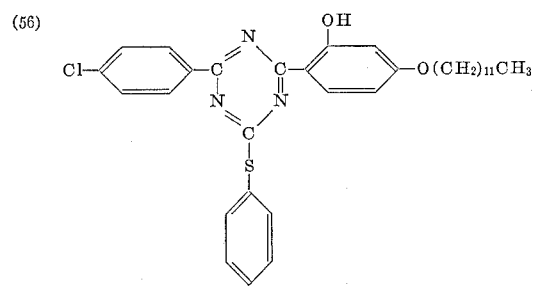

melts at 108 to 109° C. and reveals the following data.
$C_{33}H_{38}O_2N_3ClS$ calculated: C, 68.79; H, 6:65; N, 7.29%. Found: C, 68.88; H, 6.65; N, 7.14%.

EXAMPLE 14

When in Example 13 n-bromododecane is replaced by bromoacetic acid ethyl ester, and the crude product is chromatographed on alumina III with benzene and then recrystallized from benzene+ethanol, the product of the formula

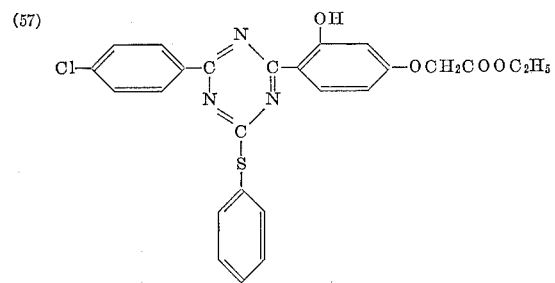

is obtained in a similar yield and purity. It melts at 163 to 165° C.

$C_{25}H_{20}O_4N_3ClS$ calculated: C, 60.79; H, 4.08; N, 8.51%. Found: C, 60.88; H, 3.94; N, 8.56%.

EXAMPLE 15

A solution of 10.2 parts of the compound of the Formula 54 and 1.55 parts of potassium hydroxide (of 90% purity) in 50 parts of dimethyl sulphoxide is mixed with 6 parts of phenacylbromide, and the reaction solution is stirred for 4 hours at 45 to 50° C. The resulting thick magma is then mixed with 50 parts of methanol, suctioned, washed with methanol and dried under vacuum at 70° C. Yield: 9.9 parts. The analytically pure product of the formula

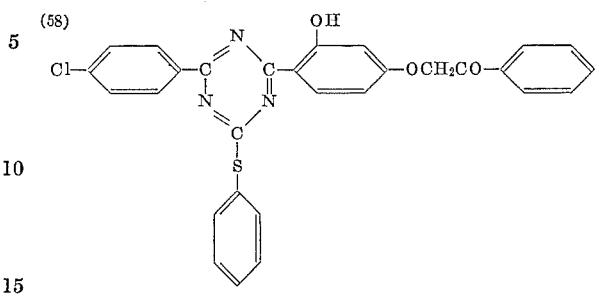

is obtained by chromatography on alumina III with benzene and subsequent recrystallization from benzene+methanol; it melts at 208.5 to 209.5° C.

$C_{29}H_{20}O_3N_3ClS$ calculated: C, 66.22; H. 3.83; N, 7.99%. Found: C, 66.65; H, 3.95; N, 7.75%.

EXAMPLE 16

12.3 parts of the compound of the Formula 54 are dissolved with heating in 50 parts of pyridine, 2.4 parts of acetylchloride are added and the whole is stirred for 15 hours at room temperature. For working up, the batch is poured into water, acidified with hydrochloric acid, and the precipitated product of the formula

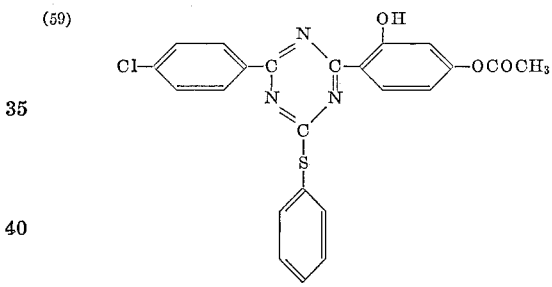

is suctioned off and washed with water until the washings run neutral, and then dried under vacuum at 100° C. Crude yield: 14.5 parts.

The analytically pure product obtained by chromatography on alumina III with benzene and recrystallized from benzene+methanol melts at 198.5 to 208° C. and reveals the following data.

$C_{23}H_{16}O_3N_3ClS$ calculated: C, 61.40; H, 3.58; N, 9.34%. Found: C, 61.62; H, 3.54; N, 9.59%.

EXAMPLE 17

When in Example 16 acetylchloride is replaced by an equivalent quantity of benzoylchloride, the product of the formula

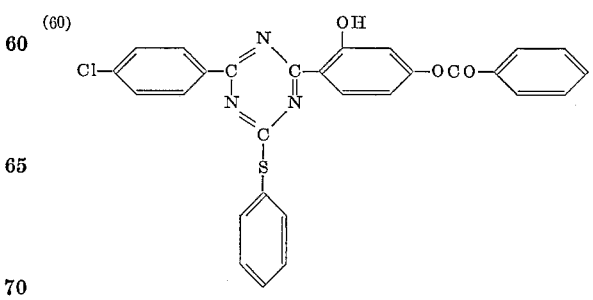

is obtained in a similar yield and purity; it melts at 118 to 128° C.

$C_{28}H_{18}O_3N_3ClS$ calculated: C, 65.69; H, 3.94; N, 8.21%. Found: C, 65.30; H, 3.60; N, 9.25%.

EXAMPLE 18

12.3 parts of the compound of the Formula 54 are dissolved in 120 parts of benzene and 10 parts of triethylamine, 2.5 parts of ethyl isocyanate are dropped in at 50° C., and the batch is heated for 1 hour at 80° C., cooled to room temperature, mixed with 150 parts of petroleum ether and the precipittaed product of the formula

(61)
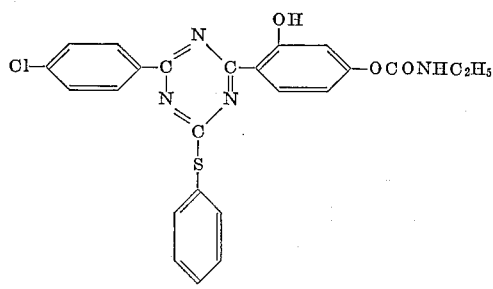

is suctioned off and washed with petroleum ether. The analytically pure product obtained by two recrystallizations from dimethylformamide+methanol melts at 196° C. with decomposition and reveals the following data.

$C_{24}H_{19}O_3N_4ClS$ calculated: C, 60.19; H, 4.00; N, 11.70%. Found: C, 60.38; H, 4.13; N, 11.63%.

EXAMPLE 19

A solution of 217.5 parts of 2-phenyl-4-para-chloro-thiophenoxy-6-chloro-1,3,5-triazine and 71.5 parts of resorcinol in 1000 parts of nitrobenzene is mixed with 86.5 parts of aluminium chloride at a rate such that the temperature does not rise above 30° C. The batch is then stirred for 2 days at room temperature and then for 3 hours at 50° C., worked up by being poured into water, washed neutral, and the organic solvent is expelled with steam. Crude yield: 233 parts. The analytically pure product of the formula

(62)
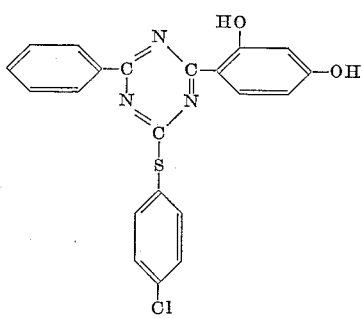

is obtained by two recrystallizations from aqueous alcohol followed by two recrystallizations from chloroform+cyclohexane; it melts at 240.5 to 241° C.

$C_{21}H_{14}O_2N_3ClS$ calculated: C, 61.84; H, 3.46; N, 10.30%. Found: C, 61.82; H, 3.68; N, 10.46%.

EXAMPLE 20

12.2 parts of the compound of the Formula 62 and 1.2 parts of sodium hydroxide are dissolved in 100 parts of acetone. A solution of 3.2 parts of sodium carbonate in 15 parts of water and then 4.4 parts of diethyl sulphate in 50 parts of acetone are dropped in. The batch is stirred on for 7 hours at 45 to 50° C., and the crystalline precipitate suctioned cold, washed with methanol and dried under vacuum. Crude yield: 17 parts. After two recrystallizations from benzene+methanol the analytically pure product of the formula

(63)
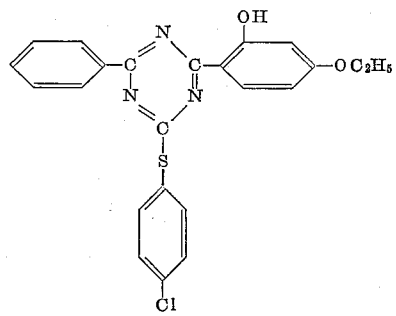

melts at 196 to 197° C.

$C_{23}H_{18}O_2N_3ClS$ calculated: C, 63.37; H, 4.16; N, 9.64%. Found: C, 63.66; H, 4.18; N, 9.83%.

EXAMPLE 21

12.2 parts of the compound of the Formula 62 are dissolved in 50 parts of pyridine, 5 parts of benzoylbromide are added, and the reaction mixture is stirred for 16 hours at room temperature. The thick mixture formed is poured into water and suctioned. The filter residue is dissolved in benzene and dried over sodium sulphate. Crude yield: 14.7 parts. The analytically pure product obtained by two recrystallizations from benzene+methanol of the formula

(64)
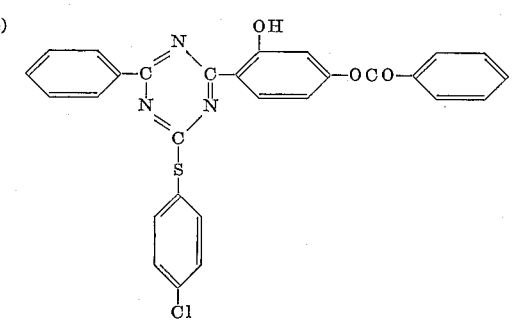

melts at 203 to 205° C. and reveals the following data.

$C_{28}H_{18}O_3N_3ClS$ calculated: C, 65.69; H, 3.54; N, 8.21%. Found: C, 65.70; H, 3.40; N, 8.24%.

EXAMPLE 22

12.2 parts of the compound of the Formula 62 are dissolved in 200 parts of benzene and 10 parts of triethylamine, and 2 parts of methyl isocyanate are added. 5 minutes after addition of the latter, the product of the formula

(65)
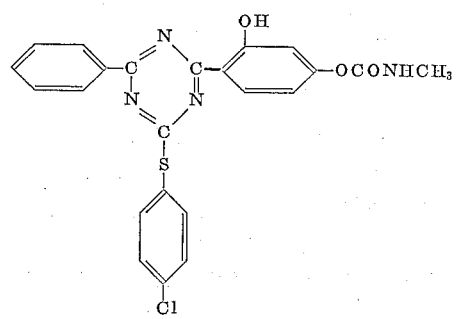

begins to crystallize out at a reaction temperature of 80° C. The batch is stirred on for 3 hours at 80° C., then cooled to room temperature, mixed with 100 parts of petroleum ether and the precipitate suctioned off. The filter residue is stirred for 30 minutes with 100 parts of methanol, then suctioned off and dried. Yield: 6.6 parts. Melting point: 213.5 to 217° C.

$C_{23}H_{17}O_3N_4ClS$ calculated: C, 59.42; H, 3.69; N, 12.05%. Found: 57.40; H, 3.86; N, 12.04%.

EXAMPLE 23

A mixture of 92 parts of 2-para-chlorophenyl-4-para-chlorothiophenoxy-6-chloro-1,3,5-triazine, 27.5 parts of resorcinol, 34 parts of aluminium chloride and 600 parts of nitrobenzene is stirred overnight at 35° C. The clear solution is poured into 2000 parts of water and then subjected to steam distillation. The precipitated product (crude yield 103 parts) is dried under vacuum.

The analytically pure product obtained by recrystallization from ortho-dichlorobenzene, of the formula

(66) 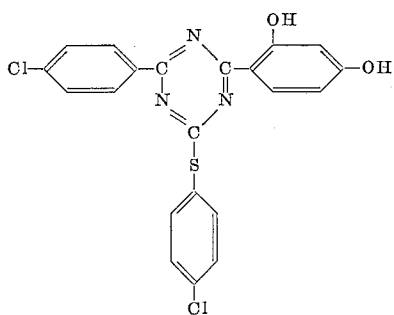

melts at 240 to 241° C. and reveals the following data.
$C_{21}H_{13}O_2N_3Cl_2S$ calculated: C, 57.02; H, 2.96; N, 9.50%. Found: C, 57.09; H, 2.95; N, 9.51%.

EXAMPLE 24

(a) 58.7 parts of 2-(4'-chlorophenyl)-4-(benzthiazolyl-thio-[2'])-6-chloro-1,3,5-triazine and 18.2 parts of resorcinol are suspended in 350 parts of nitrobenzene and the mixture is cooled to +10° C. 45.2 parts of aluminium chloride are added and the whole is stirred until it has reached a temperature of 20 to 22° C. and then, with initial moderate cooling, kept at this temperature for 18 hours with moderate cooling. The reaction mixture is decomposed in 500 parts of ice and 1000 parts of water, the organic phase is washed and decanted until it is free from acid, and the solvent is expelled by steam distillation.

The resulting crude product is dried and extracted in a Soxhlet apparatus for 6 hours with methylene chloride.

The residue (45 parts) contains about 90% of the compound of the formula

(67) 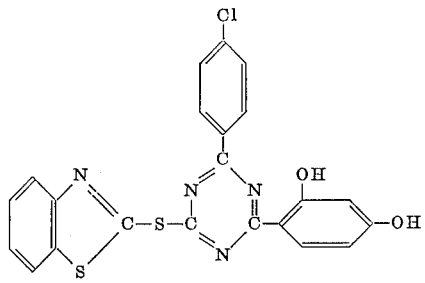

which is obtained in pure form on fractional recrystallization from aqueous dioxane and reveals the following melting points: 170 to 173° C., followed by resolidification at 183 to 185° C. and then it melts again at 216 to 218° C.

$C_{22}H_{13}O_2N_4ClS_2$ calculated: C, 56.83; H, 2.82; N, 12.05%. Found: C, 56.55; H, 2.82; N, 11.81%.

(b) The above compound is also accessible in the following manner:

A solution of 10.0 parts of 2-(4'-chlorophenyl)-4-(2', 4' - dihydroxyphenyl) - 6 - chloro - 1,3,5 - triazine in 200 parts of acetone is mixed at 18 to 22° C. within 30 minutes with a solution of 5.7 parts of the sodium salt of 2-mercaptobenzthiazole in 100 parts of acetone. Precipitation sets in after only a few minutes. The batch is allowed to react further overnight at 18 to 22° C., then poured into 1000 parts of water and acidified with concentrated hydrochloric acid, suctioned and the filter residue is dried, to yield 11 parts of the compound referred to above under (a) in a substantially pure form.

The corresponding starting materials yield in a similar manner 2 - (4' - chlorophenyl) - 4 - benzoxazolylthio [2']) - 6 - (2',4' - dihydroxyphenyl) - 1,3,5 - triazine and 2 - (4' - chlorophenyl) - 4 - (benzimidazolylthio[2'])-6-(2',4'-dihydroxyphenyl)-1,3,5-triazine.

*Table*

The compounds shown in the following table are advantageously manufactured in the case of the unmodified resorcinyl residue Y of the Formula 1 by the method described in Example 4. For the modification of the para-hydroxyl group of the said resorcinyl residue there are particularly suitable the methods described in Examples 5, 6, 7 and 8. The data shown in the table signify:

Column I—Formula No.,
Column II—structural formula,
Column III—melting at ° C.,
Column IV—analytical values for C, H, N; upper line: calculated values, lower line: values found; underneath: empirical formula.

| I | II | III | IV |
|---|---|---|---|
| 68 | (structure with Cl-phenyl, triazine, S-C-phenyl-CH₃, and dihydroxyphenyl) | 204 to 205° | 62.63  3.82  9.96<br>62.61  3.89  9.93<br>$C_{22}H_{16}O_2N_3ClS$ |

| I | II | III | IV |
|---|---|---|---|
| 69 | 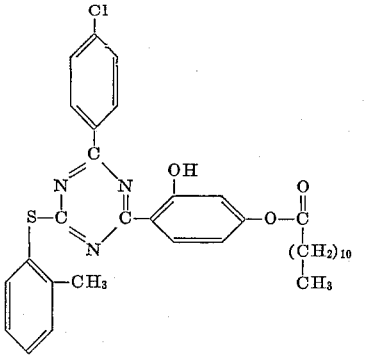 | 78 to 79° | 67.59  6.34  6.95<br>67.64  6.19  6.99<br>$C_{34}H_{38}O_3N_3ClS$ |
| 70 | 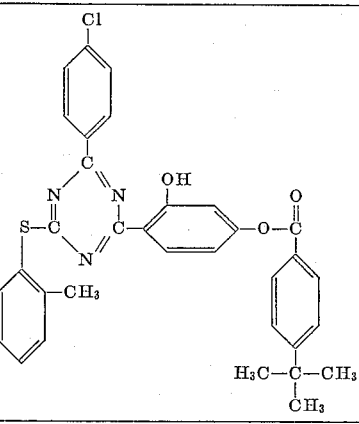 | 183 to 184° | 68.09  4.85  7.22<br>68.09  4.75  7.17<br>$C_{33}H_{28}O_3N_3ClS$ |
| 71 | 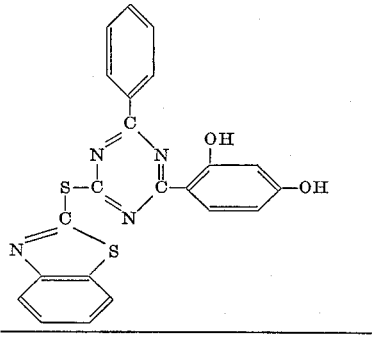 | 224 to 225° | 61.85  3.45  10.85<br>61.94  3.45  10.85<br>$C_{22}H_{14}O_2N_4S_2;$<br>¾ $C_6H_5Cl$ |
| 72 | 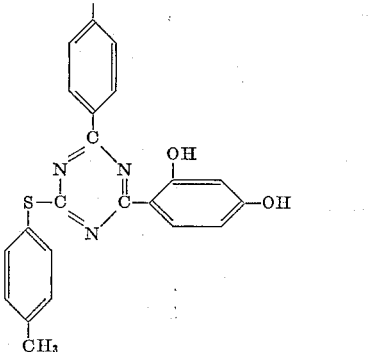 | 248 to 249° | 62.63  3.82  9.96<br>62.63  3.97  9.65<br>$C_{22}H_{16}O_2N_2ClS$ |

| I | II | III | IV |
|---|---|---|---|
| 73 | (structure: triazine with 4-Cl-phenyl, S-(4-methylphenyl), and 2-hydroxy-4-benzyloxyphenyl substituents) | 168 to 169° | 68.03 4.33 8.21<br>68.06 4.60 8.51<br>$C_{29}H_{22}O_2N_3ClS$ |
| 74 | (structure: triazine with 4-Cl-phenyl, S-(3-methylphenyl), and 2,4-dihydroxyphenyl substituents) | 186 to 188° and 213 to 215°. | 62.63 3.82 9.96<br>62.92 3.91 10.02<br>$C_{22}H_{16}O_2N_3ClS$ |
| 75 | (structure: triazine with 4-Cl-phenyl, S-(3-methylphenyl), and 2-hydroxy-4-(3-chloropropoxy)phenyl substituents) | 149 to 150° | 60.24 4.25 8.43<br>59.80 4.24 8.68<br>$C_{25}H_{21}O_2N_3Cl_2S$ |
| 76 | (structure: triazine with 4-Cl-phenyl, benzothiazolylthio, and 2-hydroxy-4-ethoxyphenyl substituents) | 111 to 113° and 168 to 171°. | 58.47 3.48 11.36<br>58.79 3.31 11.68<br>$C_{24}H_{17}O_2N_5S_2Cl$ |

EXAMPLES 25 TO 34

In the following examples, which illustrate possible uses, typical representatives were used in each case. Quite generally, all compounds mentioned in the foregoing description are equally suitable, except that the different solubilities of the individual compound in the substrate to be used must be taken into consideration. It may further be necessary to take into consideration the fact that compounds containing two resorcinyl residues display an absorption maximum at about 355 mμ and those which contain only one resorcinyl residue have a maximum at about 340 mμ.

EXAMPLE 25

A film about 60μ thick is prepared from a 10% acetonic solution of acetylcellulose which contains 1% of the compound of the Formula 46 referred to acetylcellulose.

After having been dried, the film displays the following light transmission values in percent:

| Wavelength in mµ | Light transmission, percent | |
|---|---|---|
| | Unexposed | Film exposed for 100 hours in a fadeometer |
| 280 to 360 | 0 | 0 |
| 370 | 18 | 18 |
| 380 | 51 | 51 |
| 390 | 76 | 76 |
| 400 | 85 | 85 |

Similar results are obtained, for example, with the compounds of the Formula 45, 55, 62, 63, 66, 67 or 71.

EXAMPLE 26

A paste prepared from 100 parts of polyvinylchloride, 59 parts by volume of dioctyl phthalate and 0.2 part of the compound of the Formula 48 is rolled to and fro on a calender at 145° C. to 150° C. to form a foil about 0.5 mm. thick. The polyvinylchloride foil obtained in this manner absorbs completely in the ultraviolet region from 280 to 370 mµ.

Instead of the compound of the Formula 48 there may be used e.g. the compound of the Formula 47, 51, 55, 57, 59, 63 or 67, 1 or 43.

EXAMPLE 27

A mixture of 100 parts of polyethylene and 0.2 part of the compound of the Formula 51 is rolled to and fro on a calender at 130 to 140° C. to form a foil which is then pressed at 150° C.

The resulting polyethylene foil is substantially impermeable to ultraviolet light within the region from 280 to 370 mµ.

Instead of the compound of the Formula 51 there may be used, for example, the compound of the Formula 1, 49 or 55.

EXAMPLE 28

A mixture of 100 parts of polypropylene and 0.2 part of the compound of the Formula 1, 47, 48 or 52 is rolled to and fro on a calender at 170° C. to a form a sheet which is then pressed at 230 to 240° C. and under a maximum pressure of 40 kg./cm.² to form a sheet 1 mm. thick.

The resulting sheets are impermeable to ultraviolet light within the region from 280 to 370 mµ.

A similar result is obtained with the other compounds described in the examples hereof.

EXAMPLE 29

0.2 part of the compound of the Formula 50 is dissolved in 1.8 parts of monostyrene and then 0.5 part of a solution of cobalt napthenate in monostyrene (containing 1% of cobalt) is added. There are then added 40 parts of an unsaturated polyester resin based on maleic acid, phthalic acid, ethylene glycol, in mono-styrene, and the whole is stirred for 10 minutes. 1.7 parts of a catalyst solution (methylethylketone peroxide in dimethylphthalate) are dropped in and the air-free mixture is thoroughly mixed and then poured in between two glass panes. After about 20 minutes the 1 mm. thick polyester sheet has solidified sufficiently to enable it to be taken out of the mould. It is impermeable to ultraviolet light within the region from 280 to 380 mµ and displays after 1000 hours exposure in the Xeno test apparatus no sign of yellowing. When the compound of the Formula 50 is omitted, yellowing appears in the Xeno test after only 500 hours.

Instead of the compound (50) there may be used the compound of the Formula 1, 45 to 49, 55, 57, 59, 60, 62, 66 or 67.

EXAMPLE 30

10,000 parts of a polyamide (Perlon) in chip form, prepared in known manner from caprolactam, are mixed for 12 hours in a tumbler with 30 parts of the compound of the Formula 1, 46 or 55. The chips treated in this manner are melted in a boiler from which the air has been displaced by means of superheated steam and which is heated at 300° C.; the melt is stirred for half an hour and then expressed through a spinneret under a pressure of 5 atmospheres (gauge). The filament spun in this manner is cooled and wound on a spinning bobbin under tension.

The degradation of the macromolecules caused on exposure in a fadeometer is substantially inhibited by the addition of the above-mentioned compounds.

EXAMPLE 31

12 g. of polyacrylonitrile (Leacryl ACSA, Milano, Type 16) are strewn into 88 g. of dimethylformamide with stirring until all has dissolved. 0.1 g. of the compound of the Formula 1 or 46, which dissolve immediately, is then added. The viscous mass is poured over a cleaned plate of glass and spread out with a film-drawing rod, and dried for 20 minutes in a vacuum drying cabinet at 120° C. under a vacuum of 150 mm. Hg. A foil is obtained which about 0.05 mm. thick and is easy to detach from the glass support.

The foil obtained in this manner is completely colourless and absorbs ultraviolet light of a wavelength of up to 360µ completely.

EXAMPLE 32

25 g. of distilled monostyrene are prepolymerized in a closed bottle in a heating cabinet for 2 days at 90° C., and 0.25 g. of the compound of the Formula 1, 48, 55, 60 or 62 and 0.025 g. of benzoylperoxide are then slowly stirred into the viscous mass. The mixture is then poured into a cubic mould made from aluminium foil and kept thus for one day at 70° C. When the mass has completely solidified and cooled, the mould is broken apart. The resulting cube is then pressed in a hydraulic press at a temperature of 138° C. under a pressure of 150 kg./cm.² to form a sheet 1 mm. thick.

The polyester sheet obtained in this manner is impermeable to ultraviolet light within the region from 280 to 380 mµ.

EXAMPLE 33

8 g. of a commercial mixture of toluylene-2,4-diisocyanate and -2,6-diisocyanate (65:35) and 20 g. of a commercial, moderately branched ester from adipic acid/diethyleneglycol and triol are stirred together for about 15 seconds. 2 ml. of a catalyst mixture consisting of 6 ml. of an activator based on a tertiary amine, 3 ml. of a dispersant, 3 ml. of a commercial stabilizer and 2 ml. of water as well as 0.28 g. of the compound of the Formula 1, 44, 48, 51 or 55 are then added and the batch is stirred for a short time. A foamed fleece forms which 30 minutes later is placed in a water bath and another half hour later it is rinsed in water and dried at room temperature.

The addition of one of the above-mentioned compounds increases the stability of the fleeces during the exposure in the Xeno test apparatus or in the open. The aforesaid absorbers can also be incorporated with ease in numerous other polyurethanes.

EXAMPLE 34

At least 0.1 g. of the compound of the Formula 1, 44, 46 or 55 is dissolved in 40 g. of clear nitrocellulose lacquer (25%). This lacquer is then applied uniformly by means of a coating doctor to maple boards or strips of paper. The lacquer dries within a short time.

The addition of the above ultraviolet absorbers to the lacquer does not change the shade of the wood or paper. Nor does it change on exposure to the light of an ultraviolet lamp or during a weathering test in the open.

Equally good results are obtained by using acrylic resin lacquers or alkyd-melamine resin lacquers.

What is claimed is:
1. A hydroxyphenyl-1,3,5-triazine of the formula

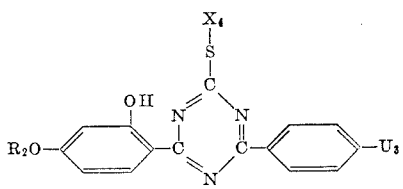

where $X_4$ represents a member selected from the group consisting of a phenyl group, a para-chlorophenyl group, an alkylphenyl group whose alkyl radical contains 1 to 4 carbon atoms and a 2-benzthiazolyl group; $R_1$ represents a member seelcted from the group consisting of a hydrogen atom, a $C_1$–$C_{12}$ alkenyl group, a $C_1$–$C_{12}$ alkyl group and a radical of the formula

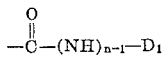

wherein $n$ stands for a whole number from 1 to 2 and $D_1$ for a member selected from the group consisting of a $C_1$–$C_{18}$ alkyl group, a $C_1$–$C_{18}$ cycloalkyl group and a benzene radical and $U_3$ represents a member selected from the group consisting of a hydrogen atom and a chlorine atom.

2. A hydroxyphenyl-1,3,5-triazine of the formula

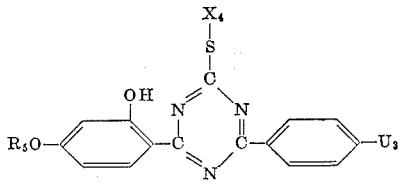

where $X_4$ represents a member selected from the group consisting of a phenyl group, a para-chlorophenyl group, an alkylphenyl group whose alkyl radical contains 1 to 4 carbon atoms and a 2-benzthiazolyl group; $R_5$ represents a member selected from the group consisting of a hydrogen atom, an alkyl group, a halogenoalkyl group, a carbalkoxyalkyl group containing up to 12 carbon atoms, a benzyl group and a group of the formula

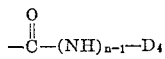

wherein $n$ stands for a whole number from 1 to 2 and $D_4$ is a member seelcted from the group consisting of an alkyl group containing 1 to 18 carbon atoms, a phenyl group, an alkylphenyl group containing 1 to 4 carbon atoms, and $U_3$ stands for a member selected from the group consisting of a hydrogen atom and a chlorine atom.

3. A hydroxyphenyl-1,3,5-triazine of the formula

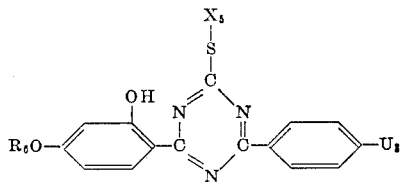

where $X_5$ represents a 2-benzthiazolyl radical, $U_3$ a member selected from the group consisting of a hydrogen and a chlorine atom and $R_6$ represents a member selected from the group consisting of a hydrogen atom and an alkyl group containing 1 to 4 carbon atoms.

4. A hydroxyphenyl-1,3,5-triazine of the formula

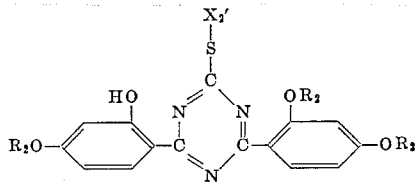

where $X_2'$ represents a 2-benzthiazolyl group, and each of the symbols $R_2$ stands for an alkyl group containing up to 18 carbon atoms which may be substituted by a member selected from the group consisting of a chlorine atom, a hydroxyl, cyano and carboxyl group and a carbalkoxy group, a carbamyl group, an aralkyl group and an alkenyl group each containing up to 9 carbon atoms and a radical of the formula

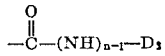

wherein $n$ stands for a whole number from 1 to 2 and $D_2$ represents a member selected from the group consisting of an alkyl group containing up to 18 carbon atoms, a phenyl group which may be substituted by a member selected from the group consisting of a chlorine atom, a phenyl group, a hydroxyl group, an alkyl group, and an alkoxy group each containing up to 8 carbon atoms.

References Cited by the Examiner
UNITED STATES PATENTS
2,232,871   2/1941   Schmidt et al. _____ 260—248 XR
OTHER REFERENCES
Koopman: "Niewe Herbicide 1,3,5-Triazine Derivaten," University of Groningen, Netherlands (1957), pp. 18–20.
Fieser et al.: "Advanced Organic Chemistry," Reinhold Pub. Corp., New York (1961), p. 650.

WALTER A. MODANCE, *Primary Examiner.*
J. M. FORD, *Assistant Examiner.*

Notice of Adverse Decision in Interference

In Interference No. 97,116 involving Patent No. 3,293,249, H. R. Biland, C. Luethi and M. Duennenberger, HYDROXYPHENYL-TRIAZINES AND PROCESS FOR THEIR MANUFACTURE, final judgment adverse to the patentees was rendered Feb. 11, 1972, as to claims 1 and 2.

[*Official Gazette July 4, 1972.*]

Disclaimer 3,293,249.—*Hans Rudolf Biland*, Basel, *Christian Luethi*, Muenchenstein, and *Max Duennenberger*, Frenkendorf, Switzerland. HYDROXYPHENYL-TRIAZINES AND PROCESS FOR THEIR MANUFACTURE. Patent dated Dec. 20, 1966. Disclaimer filed Apr. 11, 1972, by the inventors, and the assignee, *Ciba Limited*, assenting.

Hereby enters this disclaimer to claims 1 and 2 of said patent.

[*Official Gazette December 26, 1972.*]